US010302168B2

(12) United States Patent
Shibasaki et al.

(10) Patent No.: US 10,302,168 B2
(45) Date of Patent: May 28, 2019

(54) PRESSURE BUFFER DEVICE (71) Applicant: Showa Corporation, Gyoda-shi (JP)

(72) Inventors: Kunio Shibasaki, Gyoda (JP); Tetsuya Shirotani, Gyoda (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/521,137

(22) PCT Filed: Apr. 3, 2015

(86) PCT No.: PCT/JP2015/060573
§ 371 (c)(1),
(2) Date: Apr. 21, 2017

(87) PCT Pub. No.: WO2016/151870
PCT Pub. Date: Sep. 29, 2016

(65) Prior Publication Data
US 2018/0017128 A1 Jan. 18, 2018

(30) Foreign Application Priority Data

Mar. 25, 2015 (JP) .................................. 2015-063407

(51) Int. Cl.
*F16F 9/36* (2006.01)
*F16F 9/18* (2006.01)
(Continued)

(52) U.S. Cl.
CPC .................. *F16F 9/36* (2013.01); *F16F 9/18* (2013.01); *F16F 9/3242* (2013.01);
(Continued)

(58) Field of Classification Search
CPC ...... F16F 9/18; F16F 9/36; F16F 9/362; F16F 9/364; F16F 9/3242; F16F 9/3278;
(Continued)

(56) References Cited

U.S. PATENT DOCUMENTS 4,287,970 A * 9/1981 Eusemann ............... F16F 9/364
188/269
4,482,036 A * 11/1984 Wossner .................. F16F 9/364
188/322.13
(Continued)

FOREIGN PATENT DOCUMENTS

CN 103363007 A 10/2013
DE 4311101 A1 * 10/1994 .............. F16F 9/364
(Continued)

OTHER PUBLICATIONS

International Search Report dated May 12, 2015 for the corresponding PCT Application No. PCT/JP2015/060573.
(Continued)

*Primary Examiner* — Thomas J Williams
(74) *Attorney, Agent, or Firm* — Leason Ellis LLP (57) ABSTRACT A hydraulic buffer device includes a first cylinder that stores oil, a rod member capable of being moved with respect to the first cylinder as being inserted into the first cylinder toward a first side of the first cylinder and being protruded outward from the first cylinder on a second side of the first cylinder, a rod guide that covers the second side of the first cylinder as having a through-hole, an oil seal arranged at the outer side of the rod member in the radial direction on the second side of the first cylinder, a groove portion that forms a flow path for oil flowing from the inside of the first cylinder toward the oil seal, and a small-diameter portion that restricts flow of oil flowing through the groove portion. An appropriate amount of fluid is supplied to a seal member in a pressure buffer device.

7 Claims, 6 Drawing Sheets (51) Int. Cl.
  *F16F 9/32* (2006.01)
  *B60G 13/08* (2006.01)
(52) U.S. Cl.
  CPC .......... *F16F 9/3257* (2013.01); *F16F 9/3278* (2013.01); *B60G 13/08* (2013.01); *B60G 2300/124* (2013.01); *F16F 2230/30* (2013.01)
(58) Field of Classification Search
  CPC ....... F16F 2230/30; F16J 15/56; F16J 15/324; B60G 13/08
  USPC ........................................ 188/322.16, 322.17
  See application file for complete search history.

(56) References Cited

U.S. PATENT DOCUMENTS

| | | | | |
|---|---|---|---|---|
| 4,494,632 A * | 1/1985 | de Baan | ................. | F16F 9/364 188/269 |
| 4,989,701 A * | 2/1991 | Yamaoka | ................ | F16F 9/364 188/315 |
| 5,211,268 A * | 5/1993 | Lizell | ...................... | F16F 9/364 188/281 |
| 5,363,945 A * | 11/1994 | Lizell | ...................... | F16F 9/364 188/281 |
| 5,477,949 A | 12/1995 | Förster et al. | | |
| 6,003,848 A * | 12/1999 | Cotter | ................... | F16F 9/0218 188/322.16 |
| 6,105,739 A * | 8/2000 | Deppert | ............... | F16J 15/3224 188/322.17 |
| 7,011,193 B2 * | 3/2006 | Lemmens | ............ | F16F 9/3405 188/322.17 |
| 7,997,393 B2 * | 8/2011 | Hart | ...................... | F16F 9/3285 188/267.2 |
| 2005/0056504 A1 | 3/2005 | Holiviers | | |

FOREIGN PATENT DOCUMENTS

| | | | | |
|---|---|---|---|---|
| DE | 102005009151 A1 * | 9/2006 | ............. | F16F 9/362 |
| JP | 60-152504 U | 10/1985 | | |
| JP | 2005-321020 A | 11/2005 | | |
| JP | 2007-506055 A | 3/2007 | | |
| JP | 2009-287719 A | 12/2009 | | |

OTHER PUBLICATIONS

Office Action dated Jul. 27, 2018 for the corresponding Chinese Patent Application No. 201580057803.3.

* cited by examiner

PRESSURE BUFFER DEVICE

CROSS-REFERENCE TO RELATED PATENT APPLICATIONS

This application is a U.S. National Phase Application under 35 U.S.C. § 371 of International Patent Application No. PCT/JP2015/060573, filed Apr. 3, 2015 and claims the benefit of Japanese Patent Application No. 2015-063407, filed Mar. 25, 2015, all of which are incorporated by reference in their entireties herein. The International Application was published in Japanese on Sep. 29, 2016 as International Publication No. WO/2016/151870 under PCT Article 21(2).

FIELD OF THE INVENTION

The present invention relates to a pressure buffer device.

BACKGROUND OF THE INVENTION

A suspension system for a vehicle such as an automobile is provided with a pressure buffer device using a damping force generator for improving comfortability and drive stability by appropriately absorbing vibration to be transmitted from a road to a vehicle body during travelling. For example, such a pressure buffer device includes a piston that partitions the inside of a cylinder as being movably arranged in the cylinder, and a rod member that is connected to the piston. Here, damping force is generated by applying resistance to fluid flow caused in accordance with movement of the piston (e.g., see Patent Document 1).

CITED DOCUMENT

Patent Document

Patent Document 1: Japanese Patent Application Laid-Open No. 2007-506055

SUMMARY OF THE INVENTION

A seal member is arranged at the outer side of the rod member to suppress outflow of fluid in the cylinder. There is a case to improve liquid tightness, for example, between the seal member and the rod member by supplying a part of the fluid in the cylinder to the seal member. In such a case, it is preferable that an appropriate amount of fluid is supplied from the inside of the cylinder to the seal member.

An object of the present invention is to supply an appropriate amount of fluid to a seal member in a pressure buffer device.

In view of the above, a pressure buffer device of the present invention includes a cylinder configured to store fluid, a rod member configured to be capable of being moved with respect to the cylinder as being inserted into the cylinder toward a first side of the cylinder and being protruded outward from the cylinder on a second side of the cylinder, a cover member that covers the second side of the cylinder as having a through-hole to which the rod member is inserted, a seal member arranged at the outer side of the rod member in the radial direction on the second side of the cylinder, a flow path portion that forms a flow path for fluid flowing from the inside of the cylinder toward the seal member, and a restricting portion configured to restrict flow of fluid flowing through the flow path portion.

According to the present invention, it is possible to supply an appropriate amount of fluid to a seal member in a pressure buffer device.

DETAILED DESCRIPTION OF THE INVENTION

In the following, embodiments of the present invention will be described with reference to the attached drawings.

First Embodiment

Figure 1:
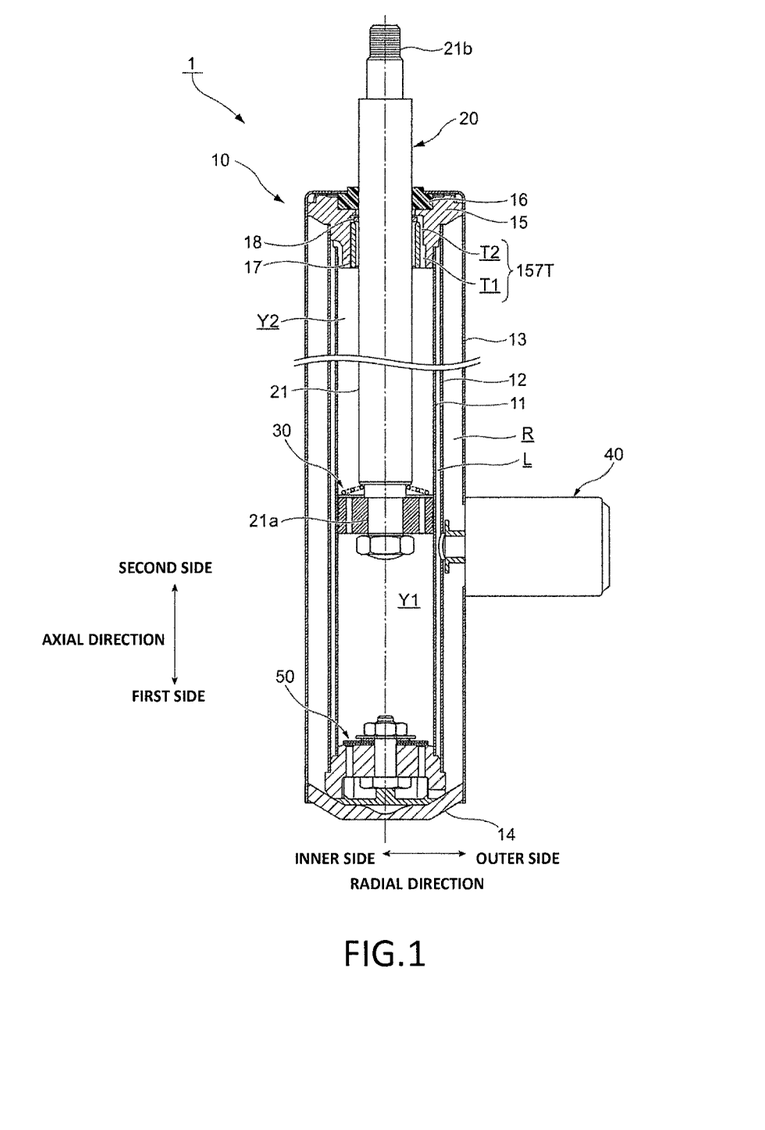
FIG. 1 is a whole structural view of a hydraulic buffer device of a first embodiment.

FIG. 1 is a whole structural view of a hydraulic buffer device 1 of a first embodiment.

In the following description, the lower side and the upper side in the axial direction of the hydraulic buffer device 1 in FIG. 1 are referred to as "a first side" and "a second side", respectively. Further, a side toward the center and a side toward the outer side in the radial direction of the hydraulic buffer device 1 are referred to as "an inner side" and "an outer side", respectively.

<Structure and Function of Hydraulic Buffer Device 1>

As illustrated in FIG. 1, the hydraulic buffer device 1 (pressure buffer device) includes a cylinder portion 10, a rod portion 20 capable of being moved along the axial direction with respect to the cylinder portion 10, a piston portion 30 arranged at an end on the first side of the rod portion 20, an outer valve portion 40 arranged at the outer side of the cylinder portion 10 in the radial direction, and a bottom valve portion 50 arranged at an end on the first side of the cylinder portion 10. Here, the first side of the rod portion 20 is inserted to the inside of the cylinder portion 10 toward the first side of the cylinder portion 10 and the second side of the rod portion 20 is protruded outward from the cylinder portion 10 on the second side of the cylinder portion 10.

The hydraulic buffer device 1 is arranged between a vehicle body and an axle, for example of a four-wheel vehicle, a motorcycle, or the like to perform damping of amplitude motion of the rod portion 20 with respect to the cylinder portion 10.

The cylinder portion 10 includes a first cylinder 11, a second cylinder 12 arranged at the outer side of the first cylinder 11, a third cylinder 13 arranged at the outer side of the second cylinder 12, a bottom portion 14 arranged at an end of the third cylinder 13 on the first side of the axial direction, a rod guide 15 arranged at the outer side of the rod portion 20 in the radial direction, an oil seal 16 arranged on the second side at the inner side of the rod guide 15, a guide bush 17 arranged on the first side at the inner side of the rod guide 15, and a resin ring 18 arranged on the second side of the guide bush 17.

The rod portion 20 includes a rod member 21 extending in the axial direction, a first-side attaching portion 21a arranged at an end on the first side of the rod member 21, and a second-side attaching portion 21b arranged at an end on the second side of the rod member 21. The first-side attaching portion 21a holds the piston portion 30. Further, an unillustrated connecting member for connecting the hydraulic buffer device 1 to a vehicle body of an automobile or the like is attached to the second-side attaching portion 21b.

The piston portion 30 is arranged in the first cylinder 11 as being slidable in the axial direction. The piston portion 30 partitions a space in the first cylinder 11 into a first oil chamber Y1 and a second oil chamber Y2. Further, the piston portion 30 includes a flow path through which oil flows between the first oil chamber Y1 and the second oil chamber Y2.

The outer valve portion 40 is arranged on a side of the third cylinder 13 and is in communication with a communication path L and a reservoir chamber R. The outer valve portion 40 provides resistance to oil flowing between the communication path L and the reservoir chamber R and generates damping force. Here, the outer valve portion 40 is capable of varying flow path sectional area for flowing oil, so that the damping force to be generated can be varied. A solenoid valve may be used for varying the flow path sectional area.

The bottom valve portion 50 is attached to ends on the first side of the first cylinder 11 and the second cylinder 12 and performs partitioning between the first oil chamber Y1 and the reservoir chamber R. Further, the bottom valve portion 50 includes a flow path that provides communication between the first oil chamber Y1 and the reservoir chamber R.

Next, a general structure of the hydraulic buffer device 1 of the present embodiment will be described.

As illustrated in FIG. 1, the hydraulic buffer device 1 (pressure buffer device) of the first embodiment includes the first cylinder 11 (cylinder) that stores oil (fluid), the rod member 21 (rod member) capable of being moved with respect to the first cylinder 11 as being inserted into the first cylinder 11 toward the first side of the first cylinder 11 and being protruded outward from the first cylinder 11 on the second side of the first cylinder 11, the rod guide 15 (cover member) that covers the second side of the first cylinder 11 as having a through-hole to which the rod member 21 is inserted, the oil seal 16 (seal member) arranged at the outer side of the rod member 21 in the radial direction on the second side of the first cylinder 11, a groove portion 157T (flow path portion) that forms a flow path for oil flowing from the inside of the first cylinder 11 toward the oil seal 16, and a small-diameter portion T2 (restricting portion) that restricts flow of oil flowing through the groove portion 157T.

In the following, structures of the above will be described in detail.

Figure 2A:
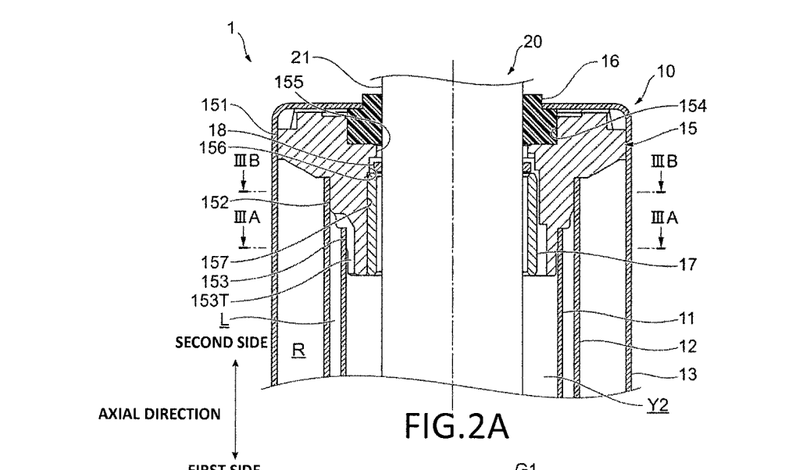
FIG. 2A is an enlarged view of an end on a second side of a cylinder portion of the first embodiment and FIG. 2B is a detailed view of a rod guide.
Figure 2B:
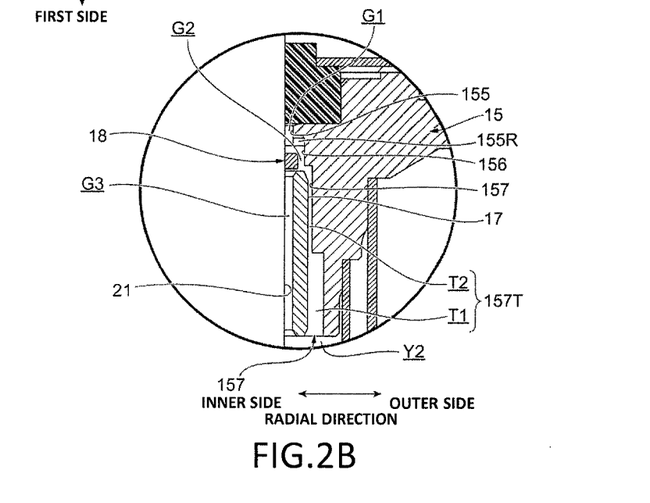
Figure 3A:
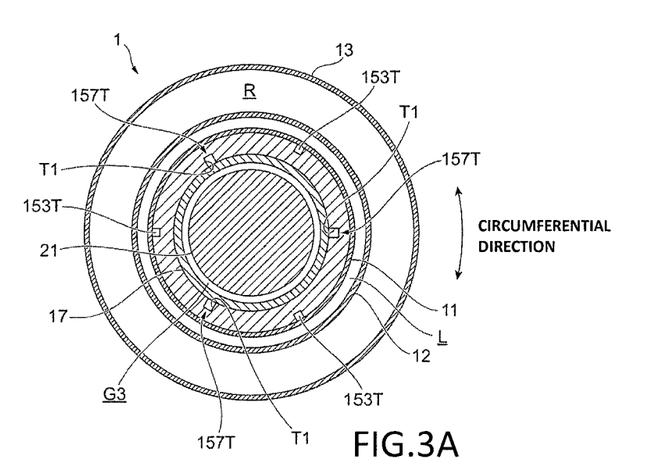
FIG. 3A is a sectional view at IIIA-IIIA in FIG. 2A
Figure 3B:
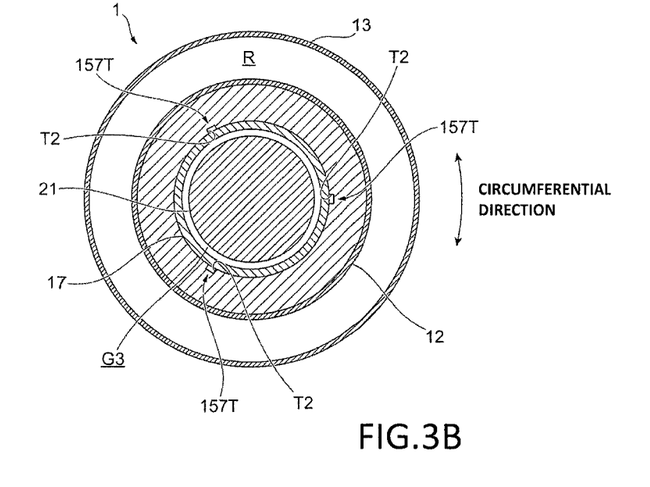
FIG. 3B is a sectional view at IIIB-IIIB in FIG. 2A.

FIG. 2A is an enlarged view of an end on the second side of the cylinder portion 10 of the first embodiment and FIG. 2B is a detailed view of the rod guide 15. FIG. 3A is a sectional view at IIIA-IIIA in FIG. 2A and FIG. 3B is a sectional view at IIIB-IIIB in FIG. 2A.

<Structure and Function of Cylinder Portion 10>

Oil is stored in the first cylinder 11 being a cylindrical member as illustrated in FIG. 1. A part of the rod member 21 on the first side and the piston portion 30 are arranged in a movable manner at the inside of the first cylinder 11.

The second cylinder 12 being a cylindrical member is arranged at the outside of the first cylinder 11 at the inside of the third cylinder 13. The second cylinder 12 forms the communication path L as a space against the first cylinder 11 for oil flowing.

The third cylinder 13 being a cylindrical member forms the reservoir chamber R as a space against the second cylinder 12.

The bottom portion 14 closes the end on the first side of the third cylinder 13 and supports the bottom valve portion 50. Further, the bottom portion 14 also functions as a member to support the first cylinder 11 and the second cylinder 12 via the bottom valve portion 50.

(Rod Guide 15)

As illustrated in FIG. 2A, the rod guide 15 is formed approximately into a cylinder shape as having the through-hole extending in the axial direction at the inner side in the radial direction. The rod guide 15 allows the rod member 21 to pass through the inner side in the radial direction and guides the rod member 21 to move. Here, the rod guide 15 may be made of metal or the like.

At the outer side in the radial direction, the rod guide 15 includes a first outer-diameter portion 151 formed on the second side in the axial direction, a second outer-diameter portion 152 formed on the first side of the first outer-diameter portion 151, and a third outer-diameter portion 153 formed on the first side of the second outer-diameter portion 512.

Further, at the inner side in the radial direction, the rod guide 15 includes a seal holding portion 154 formed on the second side in the axial direction, a rod facing portion 155 formed on the first side of the seal holding portion 154, a ring holding portion 156 formed on the first side of the rod facing portion 155, and a bush holding portion 157 formed on the first side of the ring holding portion 156.

The outer diameter of the first outer-diameter portion 151 is equal to the inner diameter of the third cylinder 13, so that the rod guide 15 is fitted to the third cylinder 13 at the first outer-diameter portion 151.

The outer diameter of the second outer-diameter portion 152 is equal to the inner diameter of the second cylinder 12, so that the rod guide 15 is fitted to the second cylinder 12 at the second outer-diameter portion 152.

The outer diameter of the third outer-diameter portion 153 is equal to the inner diameter of the first cylinder 11, so that the rod guide 15 is fitted to the first cylinder 11 at the third outer-diameter portion 153.

At the outer side in the radial direction, the third outer-diameter portion 153 includes an outer circumferential groove 153T extending in the axial direction. The outer circumferential groove 153T forms a flow path with respect to the first cylinder 11 for oil flowing. The outer circumferential groove 153T provides communication between the inner side of the first cylinder 11 (second oil chamber Y2) and the outer side of the first cylinder 11 (communication path L).

As illustrated in FIG. 2B, the seal holding portion 154 is formed as a ring-shaped groove along the circumferential direction of the rod guide 15, so as to hold the oil seal 16 at the inner side in the radial direction.

The inner diameter of the rod-facing portion 155 is larger than the outer diameter of the rod member 21, so that a first gap G1 is formed between the rod-facing portion 155 and the rod member 21.

Further, the rod-facing portion 155 includes a facing flow path 155R on the first side. The facing flow path 155R is formed as a cutout formed in the radial direction. The facing flow path 155R enables oil to flow between the first gap G1 and the groove portion 157T irrespective of a position of the resin ring 18 in the axial direction.

The inner diameter of the ring holding portion 156 is larger than the outer diameter of the resin ring 18, so that a second gap G2 is formed between the ring holding portion 156 and the resin ring 18.

The width of the ring holding portion 156 in the axial direction is larger than the width of the resin ring 18 in the axial direction, so that the resin ring 18 is held at the ring holding portion 156 as being movable in the axial direction.

The inner diameter of the bush holding portion 157 is equal to the outer diameter of the guide bush 17 except for a position where the groove portion 157T is formed, so as to hold the guide bush 17 at the inner side in the radial direction.

Further, the bush holding portion 157 includes the groove portion 157T extending in the axial direction. The groove portion 157T is in communication with the inside of the first cylinder 11 (second oil chamber Y2) on the first side and in communication with the ring holding portion 156 (second gap G2) on the second side. Thus, the groove portion 157T forms a flow path for oil from the inside of the first cylinder 11 toward the oil seal 16.

Here, the groove portion 157T includes a large-diameter portion T1 formed on the first side and a small-diameter portion T2 formed on the second side of the large-diameter portion T1.

Further, a plurality (in the present embodiment, three) of the groove portions 157T are arranged as illustrated in FIGS. 3A and 3B. The groove portions 157T are arranged at approximately even intervals along the circumferential direction of the rod guide 15.

Flow path sectional area for oil at the small-diameter portion T2 is set smaller than flow path sectional area for oil at the large-diameter portion T1. As described later, the flow path sectional area at the large-diameter portion T1 is set to facilitate guiding oil in the second oil chamber Y2.

Meanwhile, the small-diameter portion T2 forms a portion having the flow path sectional area smaller than flow path sectional area for oil at the upstream side (in the present embodiment, large-diameter portion T1 side) in an oil flow direction. Accordingly, the small-diameter portion T2 functions to restrict oil flow. The flow path sectional area at the small-diameter portion T2 is set so that an appropriate amount of oil flows from the large-diameter portion T1 toward the oil seal 16.

As described above, in the first embodiment, the groove portion 157T (flow path portion) being the flow path for supplying oil (fluid) from the inside of the first cylinder 11 (cylinder) toward the oil seal 16 (seal member) is formed at the rod guide 15 (cover member). Further, the small-diameter portion T2 (restricting portion) that restricts flow of oil flowing through the groove portion 157T is formed at the rod guide 15, that is, at a space between the rod guide 15 and the guide bush 17 (bearing member).

Here, the flow path for oil from the inside of the first cylinder 11 toward the oil seal 16 is not limited to the groove portion 157T. For example, a ring-shaped groove formed in the circumferential direction of the rod guide 15 may be adopted as long as being capable of introducing oil from the inside of the first cylinder 11. In this case, it is simply required to adopt a structure of reducing flow path sectional area for oil at the second side (oil seal 16 side) as corresponding to the small-diameter portion T2 (restricting portion).

(Oil Seal 16)

As illustrated in FIG. 2A, the oil seal 16 is an approximately cylinder-shaped member. The oil seal 16 is attached to the seal holding portion 154 formed at an end on the second side of the rod guide 15. Further, on the second side, the oil seal 16 is pressed to the rod guide 15 by the end of the third cylinder 13.

(Guide Bush 17)

The guide bush 17 is an approximately cylinder-shaped member. The guide bush 17 (bearing member) is arranged at the inner side of the rod guide 15 (cover member) in the radial direction and supports the rod member 21 movably in the axial direction.

As illustrated in FIG. 2B, the inner diameter of the guide bush 17 is larger than the outer diameter of the rod member 21, so that a third gap G3 where oil can enter is formed between the guide bush 17 and the rod member 21.

Here, the guide bush 17 may be made of metal such as iron. Further, surface treatment using fluorine resin such as Teflon (a registered trademark) may be performed on an inner circumference of the guide push 17.

(Resin Ring 18)

The resin ring 18 is a ring-shaped member. Here, the resin ring 18 may be made of resin material such as fluorine resin like Teflon or the like.

As illustrated in FIG. 2B, the resin ring 18 is press-fitted at the outer side of the rod member 21 in the radial direction. Here, the inner diameter of the resin ring 18 is slightly larger than the outer diameter of the rod member 21.

Although the hydraulic buffer device 1 includes the resin ring 18 in the present embodiment, the resin ring 18 is not necessarily required to be arranged.

The width (the length of a cross-section in the radial direction between the inner side and the outer side) of the resin ring 18 is larger than the third gap G3, so that the resin ring 18 restricts oil in the first cylinder 11 from flowing toward the second side in the axial direction through the third gap G3.

<Oil Flow at Rod Guide 15>

Next, description will be provided on oil flow in the vicinity of the rod guide 15 arranged on the second side of the cylinder portion 10 with reference to FIGS. 1, 2A, and 2B.

For example, in accordance with movement of the rod member 21 toward the second side, the piston portion 30 is moved toward the second side and pressure of oil stored in the second oil chamber Y2 is increased. Then, oil in the second oil chamber Y2 flows into the communication path L through the outer circumferential groove 153T. Oil flown into the communication path L flows into the outer valve portion 40 and damping force is generated at the outer valve portion 40.

Owing to increase of the oil pressure in the second oil chamber Y2, oil in the second oil chamber Y2 also flows into the large-diameter portion T1 of the groove portion 157T. Flow of oil flown into the large-diameter portion T1 is restricted at the small-diameter portion T2. After the restriction at the small-diameter portion T2, a predetermined amount of oil flows into the second gap G2. Then, oil in the second gap G2 is supplied to the oil seal 16.

Thus, an appropriate amount of oil is supplied to the oil seal 16, so that liquid tightness is maintained at a high level between the rod member 21 and the oil seal 16.

Here, the amount of oil flowing through the third gap G3 is adjusted by the width of the third gap G3 or by the resin ring 18. The amount of oil flowing through the third gap G3 is directly related, for example, to moving operation in the axial direction of the rod member 21 in the hydraulic buffer device 1. That is, the amount of oil flowing through the third gap G3 influences damping force characteristics of the hydraulic buffer device 1. In view of the above, control of oil supplying to the oil seal 16 is actualized by the groove portion 157T formed between the guide bush 17 and the rod member 21 being a different portion from the third gap G3 formed between the guide bush 17 and the rod member 21. Thus, in the present embodiment, the flow path for supplying oil to the oil seal 16 and the flow path for oil at the third gap G3 are arranged separately in the hydraulic buffer device 1.

Here, since it is simply required to restrict flow of oil from the inside of the first cylinder 11 toward the oil seal 16 flowing between the guide bush 17 and the rod guide 15, it is not limited to the abovementioned examples.

For example, not limited to the groove extending in the axial direction, the large-diameter portion T1 of the groove portion 157T may be a ring-shaped groove formed in the circumferential direction.

Further, a groove or the like having the same function as the groove portion 157T (small-diameter portion T2) may be formed at the guide bush 17 not at the rod guide 15.

Further, a member having the same function as the groove portion 157T (large-diameter portion T1, small-diameter portion T2) may be arranged separately from the rod guide 15 and the guide bush 17 and attached therebetween. That is, the small-diameter portion T2 (restricting portion) is simply required to be formed between the rod guide 15 (cover member) and the guide bush 17 (bearing member).

Furthermore, an opening or the like (flow path) for oil having the same function as the groove portion 157T (large-diameter portion T1, small-diameter portion T2) may be formed only at the rod guide 15 not between the rod guide 15 and the guide bush 17. That is, the small-diameter portion T2 (restricting portion) that restricts flow of oil flowing through the groove portion 157T (flow path portion) may be arranged at the rod guide 15.

Second Embodiment

Next, description will be provided on a hydraulic buffer device 1 to which a second embodiment is applied.

Figure 4A:
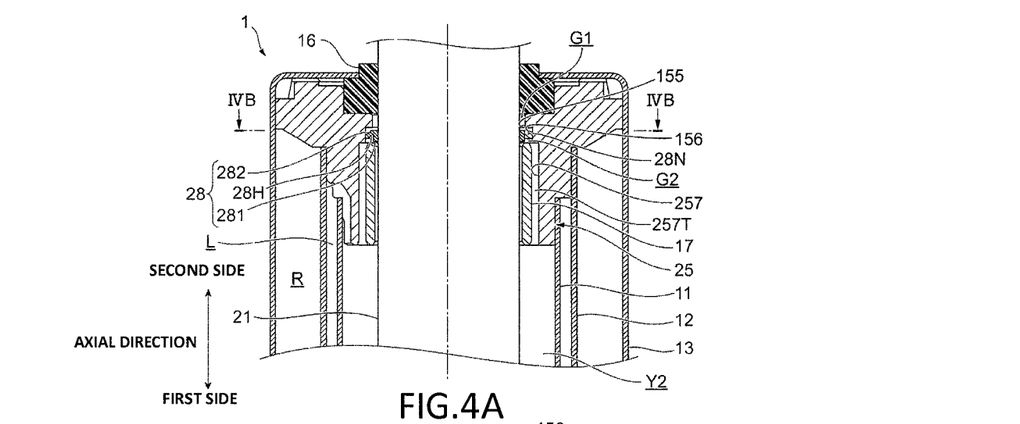
FIG. 4A is an enlarged view at an end of the second side of a cylinder portion of a second embodiment and FIG. 4B is a sectional view at IVB-IVB in FIG. 4A.
Figure 4B:
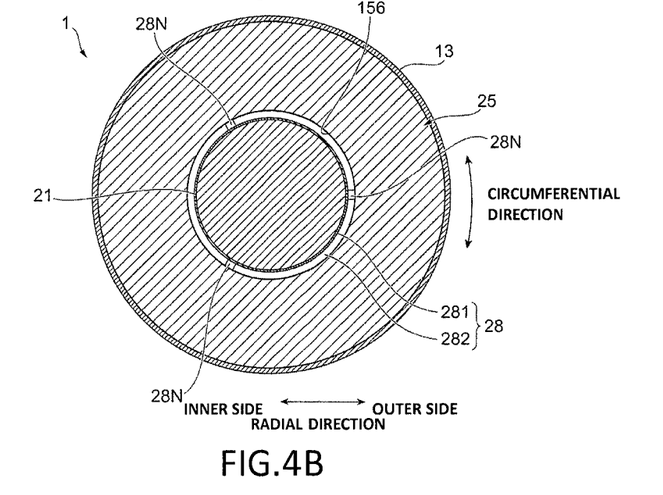

FIG. 4A is an enlarged view at an end of the second side of a cylinder portion 10 of the second embodiment and FIG. 4B is a sectional view at IVB-IVB in FIG. 4A.

In description of the second embodiment, the same reference is given to a portion being similar to that described in the first embodiment and description thereof is not repeated.

First, a general structure of the hydraulic buffer device 1 of the second embodiment will be described.

As illustrated in FIGS. 4A and 4B, the hydraulic buffer device 1 (pressure buffer device) of the second embodiment includes the first cylinder 11 (cylinder) that stores oil (fluid), the rod member 21 (rod member) capable of being moved with respect to the first cylinder 11 as being inserted into the first cylinder 11 toward the first side of the first cylinder 11 and being protruded outward from the first cylinder 11 on the second side of the first cylinder 11, the rod guide 25 (cover member) that covers the second side of the first cylinder 11 as having a through-hole to which the rod member 21 is inserted, the oil seal 16 (seal member) arranged at the outer side of the rod member 21 in the radial direction on the second side of the first cylinder 11, a groove portion 257T (flow path portion) that forms a flow path for oil flowing from the inside of the first cylinder 11 toward the oil seal 16, and a cutout portion 28N (restricting portion) of a resin ring 28 that restricts flow of oil flowing through the groove portion 257T.

In the present embodiment, the cutout portion 28N is formed at the resin ring 28. However, the cutout portion 28N may be formed at the rod member 21 (at the outer side of the resin ring 28 in the radial direction) at a position facing the resin ring 28 not at the resin ring 28. Further, the cutout portion 28N may be formed by both the resin ring 28 and the rod member 21.

Detailed description will be provided in the following.

In the hydraulic buffer device 1 of the second embodiment, a rod guide 25 and the resin ring 28 are structured differently from the rod guide 15 and the resin ring 18 of the first embodiment, respectively. In the following, the rod guide 25 and the resin ring 28 will be described mainly on different points.

The rod guide 25 includes a bush holding portion 257 that holds the guide bush 17. The bush holding portion 257 includes a groove portion 257T extending in the axial direction.

A plurality (in the present embodiment, three) of the groove portions 257T are arranged at approximately even intervals along the circumferential direction of the rod guide 25. The groove portion 257T is in communication with the inside of the first cylinder 11 (second oil chamber Y2) on the first side and in communication with the ring holding portion 156 (second gap G2) on the second side. At the groove portion 257T, flow path sectional area for oil is set to facilitate guiding oil in the first cylinder 11 in accordance with movement of the rod member 21.

As illustrated in FIG. 4B, the resin ring 28 (ring-shaped member) is an approximately ring-shaped member arranged at the outer side of the rod member 21 in the radial direction. Further, as illustrated in FIG. 4A, the resin ring 28 is arranged at more inner side of the first cylinder 11 (on more first side in the axial direction) than the oil seal 16 (seal member). The inner diameter of the resin ring 28 is equal to the outer diameter of the rod member 21. Further, the outer diameter of the resin ring 28 is equal to the inner diameter of the ring holding portion 156.

The resin ring 28 has a V-shaped cross-section. The resin ring 28 includes a contact portion 281 arranged at the inner side in the radial direction and a deformation portion 282 arranged at the outer side in the radial direction.

The contact portion 281 is in contact with the rod member 21. The deformation portion 282 is formed deformable as being in contact with the ring holding portion 156. The resin ring 28 is arranged so that an opening 28H formed by the contact portion 281 and the deformation portion 282 is oriented to the first side where the groove portion 257T is formed.

The resin ring 28 (ring-shaped member) includes the cutout portion 28N (restricting portion) formed at the outer side in the radial direction. As illustrated in FIG. 4B, a plurality (in the present embodiment, three) of the cutout portions 28N are arranged at approximately even intervals along the circumferential direction of the resin ring 28.

As illustrated in FIG. 4A, the cutout portion 28N is in communication with the groove portion 257T on the first side and in communication with the first gap G1 at the rod facing portion 155 on the second side. Flow path sectional area at the cutout portion 28N is set smaller than that at the groove portion 257T. The cutout portion 28N is arranged on the flow path for oil from the inside of the first cylinder 11 toward the oil seal 16.

In the hydraulic buffer device 1 of the second embodiment structured as described above, oil in the first cylinder 11 (second oil chamber Y2) flows into the groove portion 257T in accordance with movement of the rod member 21. Flow of oil through the groove portion 257T is restricted by the cutout portion 28N. Then, oil restricted by the cutout portion 28N is supplied toward the oil seal 16.

Thus, in the hydraulic buffer device 1 of the second embodiment as well, an appropriate amount of oil can be supplied from the inside of the first cylinder 11 toward the oil seal 16.

In the second embodiment, description is provided on the example that the cutout portion 28N is formed at the outer side of the resin ring 28. However, it is not limited to the example as long as oil flow through the groove portion 257T can be restricted.

For example, a cutout may be formed at the inner side of the resin ring 28 in the radial direction. Further, for example, a through-hole may be formed at the resin ring 28 instead of the cutout.

Third Embodiment

Figure 5:
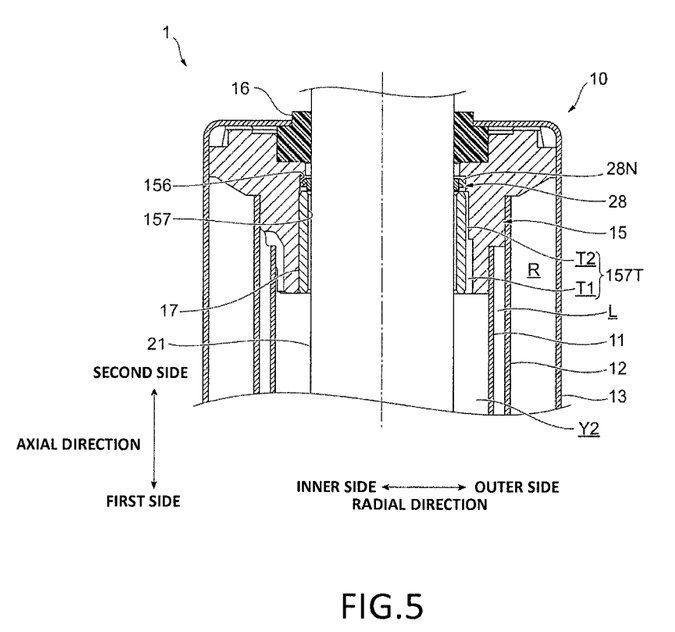
FIG. 5 is an enlarged view at an end on the second side of a cylinder portion of a third embodiment.

FIG. 5 is an enlarged view at an end on the second side of a cylinder portion 10 of a third embodiment.

In description of the third embodiment, the same reference is given to a portion being similar to that described in any of the other embodiments and description thereof is not repeated.

First, a general structure of the hydraulic buffer device 1 of the third embodiment will be described.

As illustrated in FIG. 5, the hydraulic buffer device 1 (pressure buffer device) of the third embodiment includes the first cylinder 11 (cylinder) that stores oil (fluid), the rod member 21 (rod member) capable of being moved with respect to the first cylinder 11 as being inserted into the first cylinder 11 toward the first side of the first cylinder 11 and being protruded outward from the first cylinder 11 on the second side of the first cylinder 11, the rod guide 15 (cover member) that covers the second side of the first cylinder 11 as having a through-hole to which the rod member 21 is inserted, the oil seal 16 (seal member) arranged at the outer side of the rod member 21 in the radial direction on the second side of the first cylinder 11, the groove portion 157T (flow path portion) that forms a flow path for oil flowing from the inside of the first cylinder 11 toward the oil seal 16, and the small-diameter portion T2 and the cutout portion 28N (restricting portion) of the resin ring 28 that restrict flow of oil flowing through the groove portion 157T.

As illustrated in FIG. 5, the hydraulic buffer device 1 of the third embodiment includes the rod guide 15 of the first embodiment and the resin ring 28 of the second embodiment.

In the hydraulic buffer device 1 of the third embodiment as well, flow of oil from the inside of the first cylinder 11 toward the oil seal 16 in accordance with movement of the rod member 21 is restricted by the groove portion 157T of the rod guide 15 and the cutout portion 28N of the resin ring 28.

Accordingly, in the hydraulic buffer device 1 of the third embodiment as well, an appropriate amount of oil can be supplied from the inside of the first cylinder 11 toward the oil seal 16.

Fourth Embodiment

Figure 6:
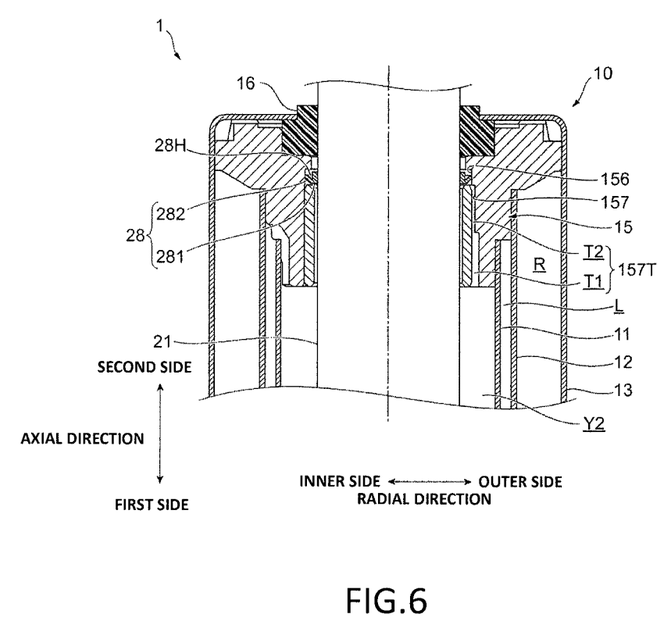
FIG. 6 is an enlarged view at an end on the second side of a cylinder portion of a fourth embodiment.

FIG. 6 is an enlarged view at an end on the second side of a cylinder portion 10 of a fourth embodiment.

In description of the fourth embodiment, the same reference is given to a portion being similar to that described in any of the other embodiments and description thereof is not repeated.

First, a general structure of the hydraulic buffer device 1 of the fourth embodiment will be described.

As illustrated in FIG. 6, the hydraulic buffer device 1 (pressure buffer device) of the fourth embodiment includes the first cylinder 11 (cylinder) that stores oil (fluid), the rod member 21 (rod member) capable of being moved with respect to the first cylinder 11 as being inserted into the first cylinder 11 toward the first side of the first cylinder 11 and being protruded outward from the first cylinder 11 on the second side of the first cylinder 11, the rod guide 15 (cover member) that covers the second side of the first cylinder 11 as having a through-hole to which the rod member 21 is inserted, the oil seal 16 (seal member) arranged at the outer side of the rod member 21 in the radial direction on the second side of the first cylinder 11, the groove portion 157T (flow path portion) that forms a flow path for oil flowing from the inside of the first cylinder 11 toward the oil seal 16, and the small-diameter portion T2 that restricts flow of oil flowing through the groove portion 157T.

As illustrated in FIG. 6, the basic structure of the hydraulic buffer device 1 of the fourth embodiment is the same as that of the hydraulic buffer device 1 of the third embodiment. In the fourth embodiment, an attaching direction of the resin ring 28 is different from that in the third embodiment. Further, in the fourth embodiment, the cutout portion 28N is not an essential structural element for the resin ring 28.

In the fourth embodiment, the opening 28H formed by the contact portion 281 and the deformation portion 282 of the resin ring 28 is oriented to the second side where the oil seal 16 is arranged.

In the hydraulic buffer device 1 of the fourth embodiment as well, flow of oil from the inside of the first cylinder 11 toward the oil seal 16 in accordance with movement of the rod member 21 can be restricted by the small-diameter portion T2 of the groove portion 157T of the rod guide 15. Accordingly, in the hydraulic buffer device 1 of the fourth embodiment as well, an appropriate amount of oil can be supplied from the inside of the first cylinder 11 toward the oil seal 16.

Further, in the hydraulic buffer device 1 of the fourth embodiment, the resin ring 28 can exert a function of a check valve. That is, the deformation portion 282 is more likely to be deformed to fall toward the second side but is less likely to be deformed toward the first side. Accordingly, the deformation portion 282 (allowing-regulating portion) of the resin ring 28 allows oil flow from the inside of the first cylinder 11 toward the oil seal 16 and restricts oil flow from the oil seal 16 toward the inside of the first cylinder 11.

In the first to fourth embodiments, description is provided on the examples that the rod guide 15 (25) and the guide bush 17 are arranged separately. However, it is not limited thereto. For example, the rod guide 15 (25) may have the function of the guide bush 17 as well. In this case, the rod guide 15 (25) and the guide bush 17 are considered as an integrated single cover member. Then, the function of the groove portion 157T may be added to the cover member.

Further, in the first to fourth embodiments, a restricting portion that restricts oil flow toward the oil seal 16 may be arranged at the rod facing portion 155 as having smaller flow path sectional area than other portions. It is possible to adopt a structure to supply an appropriate amount of oil from the inside of the first cylinder 11 toward the oil seal 16 by the restriction of oil flow at the rod facing portion 155.

Further, the structure of the oil seal 16 is not limited to the first to fourth embodiments. Another structure may be adopted as long as being a member to suppress oil outflow as being arranged at the outer side of the rod member 21 in the radial direction on the second side of the first cylinder 11.

In the first to fourth embodiments, description is provided on the example of the hydraulic buffer device 1 being a so-called triple-pipe structure formed of the first cylinder 11, the second cylinder 12, and the third cylinder 13. However, the present invention may be applied to a hydraulic buffer device being a so-called double-pipe structure formed of a first cylinder and a second cylinder arranged at the outer side of the first cylinder.

REFERENCE SIGNS LIST

1 Hydraulic buffer device (Example of pressure buffer device)
11 First cylinder (Example of cylinder)
12 Second cylinder
13 Third cylinder
15, (25) Rod guide (Example of cover member)
16 Oil seal (Example of seal member)
17 Guide bush (Example of bearing member)
18, (28) Resin ring (Example of ring-shaped member)
21 Rod member (Example of rod member)
28N Cutout portion (Example of restricting portion)
157T Groove portion (Example of flow path portion)
T1 Large-diameter portion
T2 Small-diameter portion (Example of restricting portion)
282 Deformation portion (Example of allowing-regulating portion)

What is claimed is:

1. A pressure buffer device, comprising:
   a cylinder configured to store fluid;
   a rod member configured to be capable of being moved with respect to the cylinder as being inserted into the cylinder toward a first side of the cylinder and being protruded outward from the cylinder on a second side of the cylinder;
   a cover member that covers the second side of the cylinder as having a through-hole to which the rod member is inserted;
   a seal member arranged at an outer side of the rod member in a radial direction on the second side of the cylinder;
   a bearing member configured to movably support the rod member as being arranged at an inner side of the cover member in the radial direction; and
   a flow path portion that forms a flow path for fluid flowing from an inside of the cylinder toward the seal member and contains a restricting portion and a large-diameter portion, wherein
   the restricting portion is configured to restrict flow of fluid flowing through the flow path portion and is provided in a radially outer side of the bearing member while extending in an axial direction of the rod member, and
   the large-diameter portion is arranged between the bearing member and the cover member.

2. The pressure buffer device according to claim 1, wherein the restricting portion is arranged between the bearing member and the cover member.

3. The pressure buffer device according to claim 1, wherein the restricting portion is arranged at the cover member.

4. The pressure buffer device according to claim 1, further comprising a ring-shaped member arranged at more inner side of the cylinder than the seal member,
   wherein the restricting portion is arranged at the ring-shaped member.

5. The pressure buffer device according to claim 1, further comprising an allowing-regulating portion configured to allow flow of fluid from the inside of the cylinder toward the seal member and regulate flow of fluid from the seal member toward the inside of the cylinder.

6. The pressure buffer device according to claim 1, wherein
   a flow path sectional area of the restricting portion is smaller than a flow path sectional area of the large-diameter portion.

7. The pressure buffer device according to claim 6, wherein the fluid flows in the same direction both in the restricting portion and the large-diameter portion.

* * * * *